United States Patent [19]

Singh et al.

[11] Patent Number: 5,895,089
[45] Date of Patent: Apr. 20, 1999

[54] DUAL FUNCTION ADJUSTABLE BUMPER FOR AUTOMOTIVE VEHICLE SLIDING DOOR

[75] Inventors: Rajinder Pal Singh, Canton; Roger A. Shipman, West Bloomfield, both of Mich.; Giuseppe Joe Cannella, Ancaster, Canada; Mary Teresa Bell, Monroe; Timothy Dean Pusilo, Dearborn, both of Mich.

[73] Assignee: Ford Global Technologies, Inc., Dearborn, Mich.

[21] Appl. No.: 08/828,851

[22] Filed: Mar. 31, 1997

[51] Int. Cl.$^6$ ............................................. B60J 5/06
[52] U.S. Cl. ..................... 296/207; 296/155; 49/213; 16/86 B; 16/DIG. 6
[58] Field of Search ........................ 296/207, 155, 296/146.12; 49/213, 2.5; 16/82, 85, 86 R, 86 B, DIG. 6, DIG. 10, DIG. 17

[56] References Cited

U.S. PATENT DOCUMENTS

| | | | |
|---|---|---|---|
| 4,433,507 | 2/1984 | Chikaraishi | 49/213 |
| 4,692,960 | 9/1987 | Jozefczak | 16/85 |
| 5,069,497 | 12/1991 | Clelland | 296/155 |
| 5,361,540 | 11/1994 | Rogers, Jr. et al. | 49/449 |
| 5,454,618 | 10/1995 | Sullivan | 296/97.22 |
| 5,577,795 | 11/1996 | Shinsen | 296/207 |
| 5,584,528 | 12/1996 | Cozzani . | |

FOREIGN PATENT DOCUMENTS

| | | | |
|---|---|---|---|
| 2 478 718 | 3/1981 | France . | |
| 2 643 033 | 2/1989 | France . | |
| 03 067738 | 3/1991 | Japan . | |
| 405065026 | 3/1993 | Japan | 296/155 |
| 2 135 724 | 9/1984 | United Kingdom . | |
| 2248649 | 4/1992 | United Kingdom | 296/155 |

Primary Examiner—Dennis H. Pedder
Attorney, Agent, or Firm—David B. Kelley

[57] ABSTRACT

A door bumper assembly for an automotive vehicle sliding door has an adjustable bumper head with a door face for mating with a door inner surface when the door is in a closed position to provide a predetermined lateral load to the door. A bumper base is mounted between the bumper head and a vehicle body surface at a rearward end of a door track and has a hinge face for contacting a door hinge to prevent door rearward longitudinal movement when the door is moved to a fully open position. A bolt threaded on both ends is attached on a first end to the bumper head to allow lateral adjustment with respect to the bumper base, and passes through the bumper base for attachment on a second end to a vehicle body portion.

12 Claims, 3 Drawing Sheets

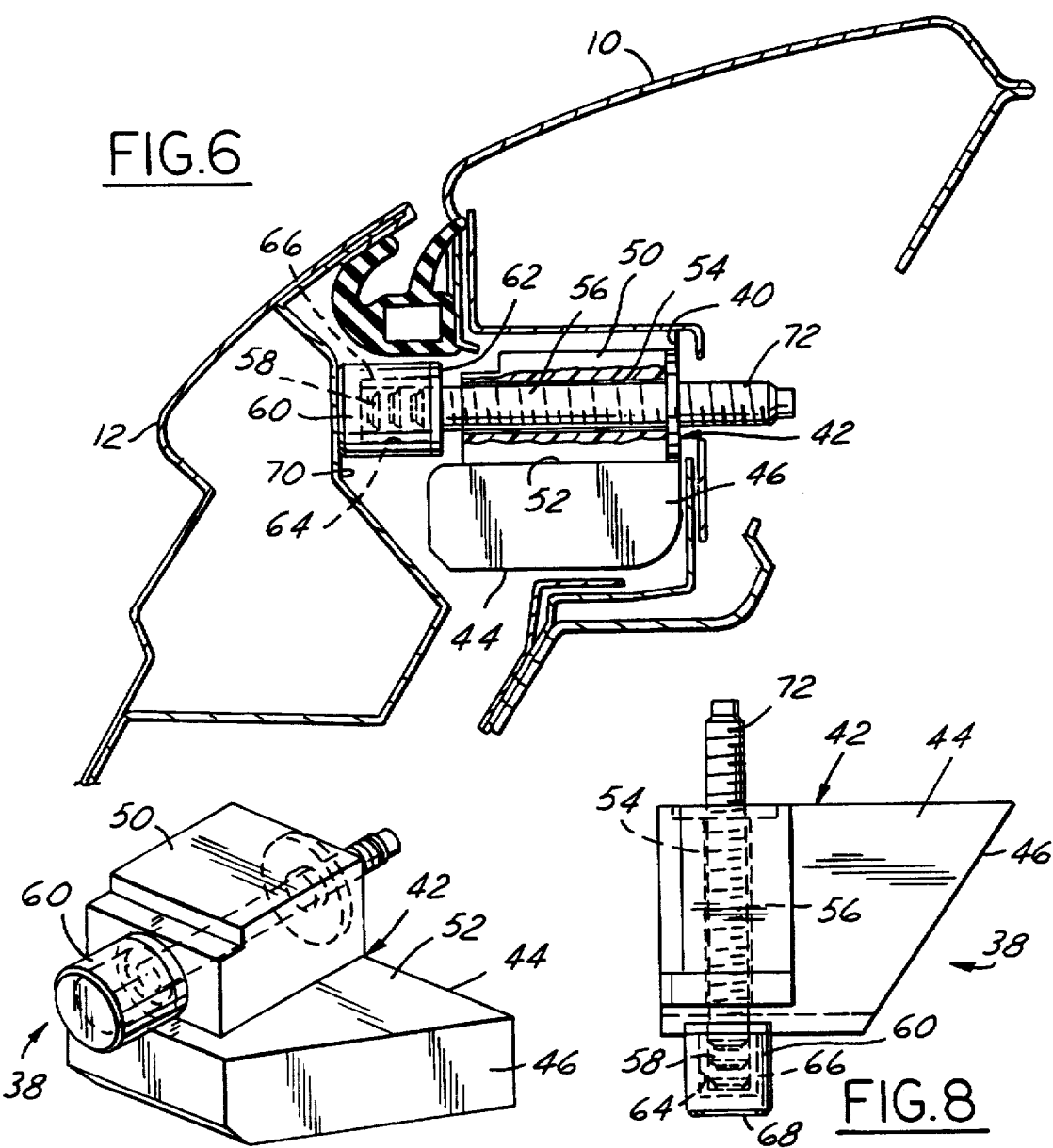
FIG.6
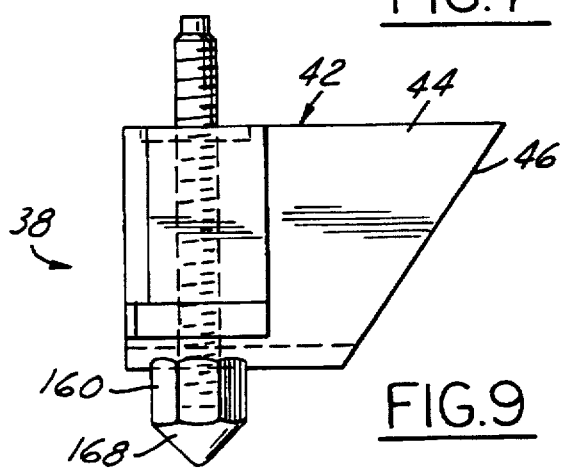
FIG.7
FIG.8
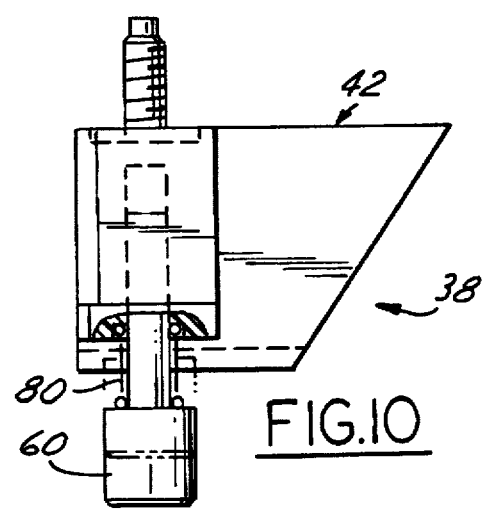
FIG.9
FIG.10

DUAL FUNCTION ADJUSTABLE BUMPER FOR AUTOMOTIVE VEHICLE SLIDING DOOR

FIELD OF THE INVENTION

The present invention relates to automotive vehicle sliding doors in general, and more specifically to a door bumper apparatus for limiting sliding door movement in two directions.

BACKGROUND OF THE INVENTION

Automotive vehicles, particularly van type vehicles, may have a sliding door for alternately covering and uncovering an access opening. The access opening is typically on a side of the vehicle and the door slides in a rearward direction on a set of tracks to a position slightly outward of an outer body surface of the vehicle to uncover the access opening. A set of door hinges connects the door into the set of tracks, with each separate hinge mounted to the door on one end and into a corresponding track on the other end, for example with a roller. It is known to have a bumper situated at a rear end of one of the tracks to engage one of the hinges to prevent further opening of the sliding door. When the hinge contacts the bumper, the sliding door is in a fully open position with the bumper limiting longitudinal movement toward the rear of the vehicle.

There is, however, a need to limit lateral movement of the sliding door when in a closed position to cover the access opening since the door can produce undesirable NVH (Noise, Vibration, Harshness) characteristics, such as squeak and rattle, if not adequately constrained. This may result when the vehicle is driven over rough roads since the hinded rollers require a certain tolerance to allow free movement within the tracks and to allow for build variation. In addition, if not properly constrained, the door may develop a poor "feel" when closed, and may give the impression that it is open when in fact it is latched shut. While it is known to furnish a wedge-slot combination on a forward edge of the sliding door to achieve a better fit between the B-pillar and the sliding door when in the closed position, a similar arrangement is not feasible for the rear edge of the sliding door due to the greater degree of lateral motion with respect to the door when moving to the closed position.

SUMMARY OF THE INVENTION

In response to the deficiencies in the related art, the present invention provides a dual function, adjustable door bumper assembly in an automotive vehicle having a body opening closable by a sliding door movable between a closed position and an open position within a door track along a door peripheral edge by a roller connected to the door by a door hinge. The assembly has a bumper head with a door face contactable against an inner surface of the door when the door is in the closed position. A bumper base is mounted between the bumper head and a vehicle body surface at a rearward end of the door track, and the bumper base has a hinge face for contacting the hinge to prevent door movement when the door is moved to the open position. The bumper head is attached to the bumper base with suitable attachment means. Means for laterally adjusting the bumper head with respect to the bumper base are provided so that the door face contacts the inner surface of the door to provide a predetermined lateral load thereto.

An advantage of the present invention is a door bumper assembly which provides an adjustable lateral load to an inner surface of a rear end of a vehicle sliding door.

Another advantage of the present invention is a door bumper assembly which limits both longitudinal and lateral movement of a vehicle sliding door when in open and closed positions, respectively.

A feature of the present invention is a laterally adjustable door bumper head attached to a bumper base with a surface for limiting longitudinal movement of the sliding door.

Yet another feature is a door bumper head having a bolt attached thereto both for attachment to the vehicle and for lateral adjustment of the bumper head with respect to the bumper base.

BRIEF DESCRIPTION OF THE DRAWINGS

These and other objects, advantages, and features of the present invention will be apparent to those skilled in the art upon reading the following description with reference to the accompanying drawings, in which:

FIG. 6 is a cross-sectional view taken along lines 6—6 of FIG. 1;

FIG. 7 is a perspective view of a preferred embodiment of a door bumper assembly according to the present invention;

FIG. 8 is a top view of the door bumper assembly of FIG. 7;

FIG. 9 is a top view of an alternative embodiment of the present invention showing a conically tipped bumper head; and FIG. 10 is a top view of a second alternative embodiment of a door bumper assembly according to the present invention having bumper head bias means.

DETAILED DESCRIPTION OF THE PREFERRED EMBODIMENT

Figure 1:
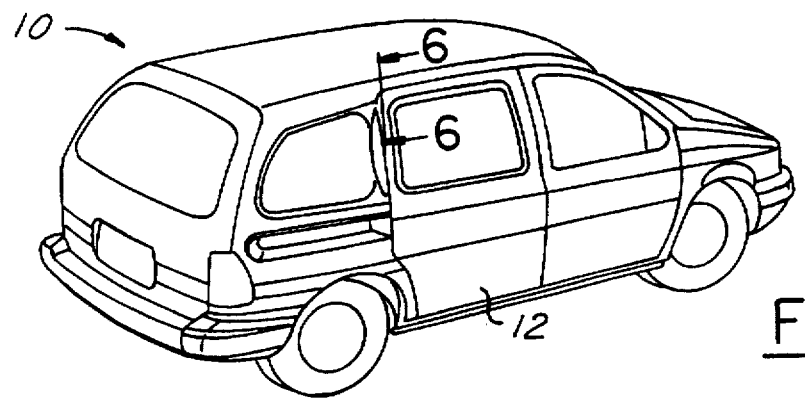
FIG. 1 is a perspective side view of a van type vehicle having a sliding door with an adjustable door bumper assembly according to the present invention.
Figure 2:
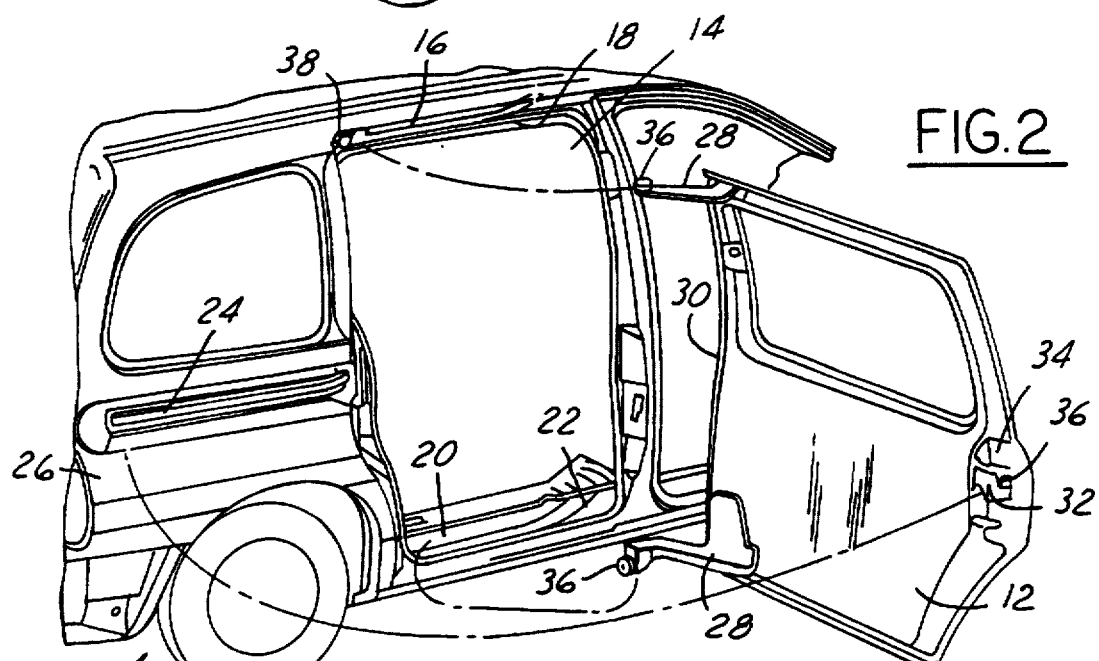
FIG. 2 is a perspective side view of the vehicle of FIG. 1 showing a door track having an adjustable bumper assembly according to the present invention.
Figure 3:
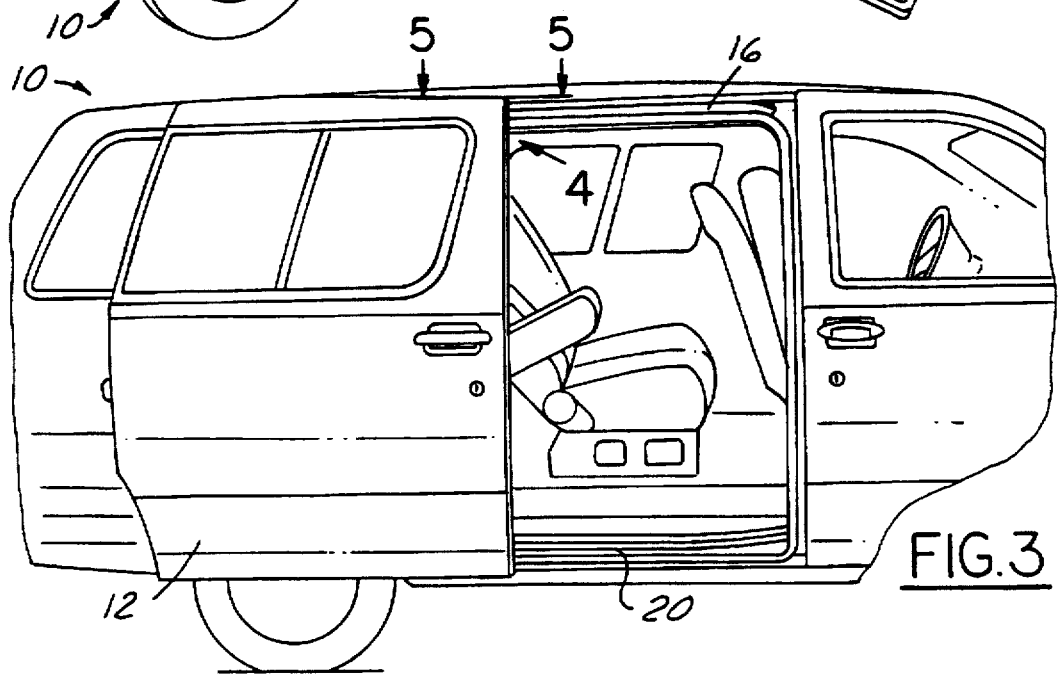
FIG. 3 is a side view of the vehicle of FIG. 1 showing a sliding door in an open position uncovering an access opening to the vehicle interior.
Figure 4:
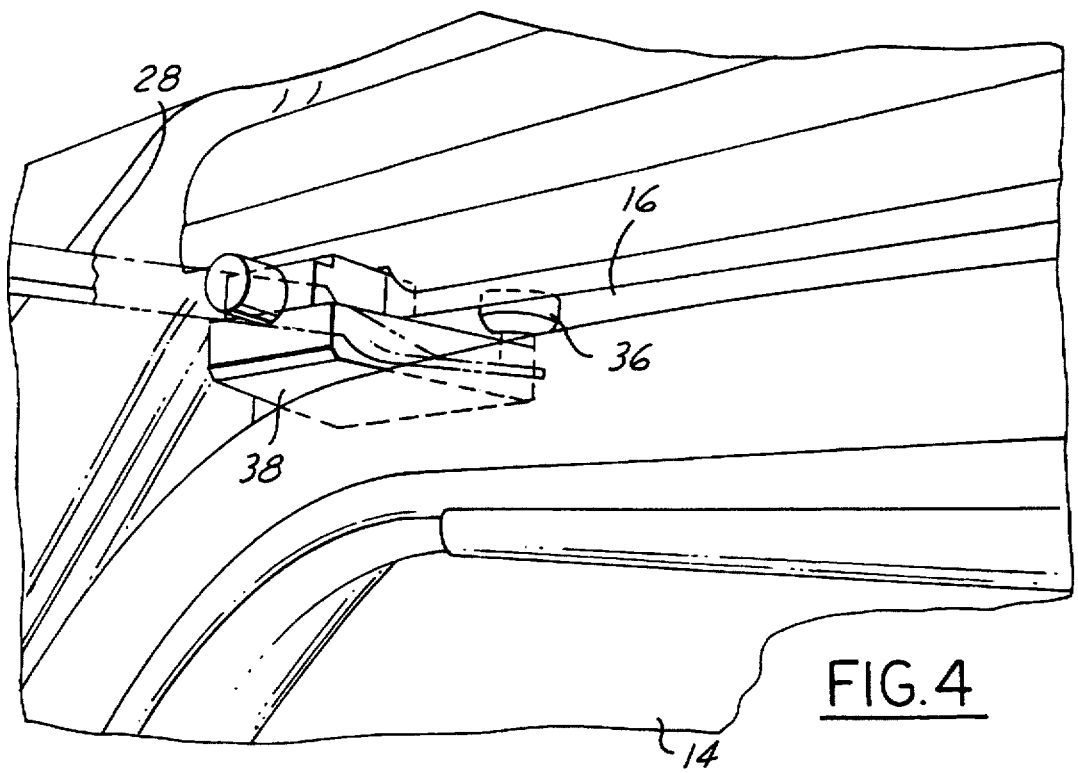
FIG. 4 is a perspective view taken in the direction of arrow 4 of FIG. 3 showing a door bumper assembly according to the present invention mounted at a rear end of an upper door track.
Figure 5:
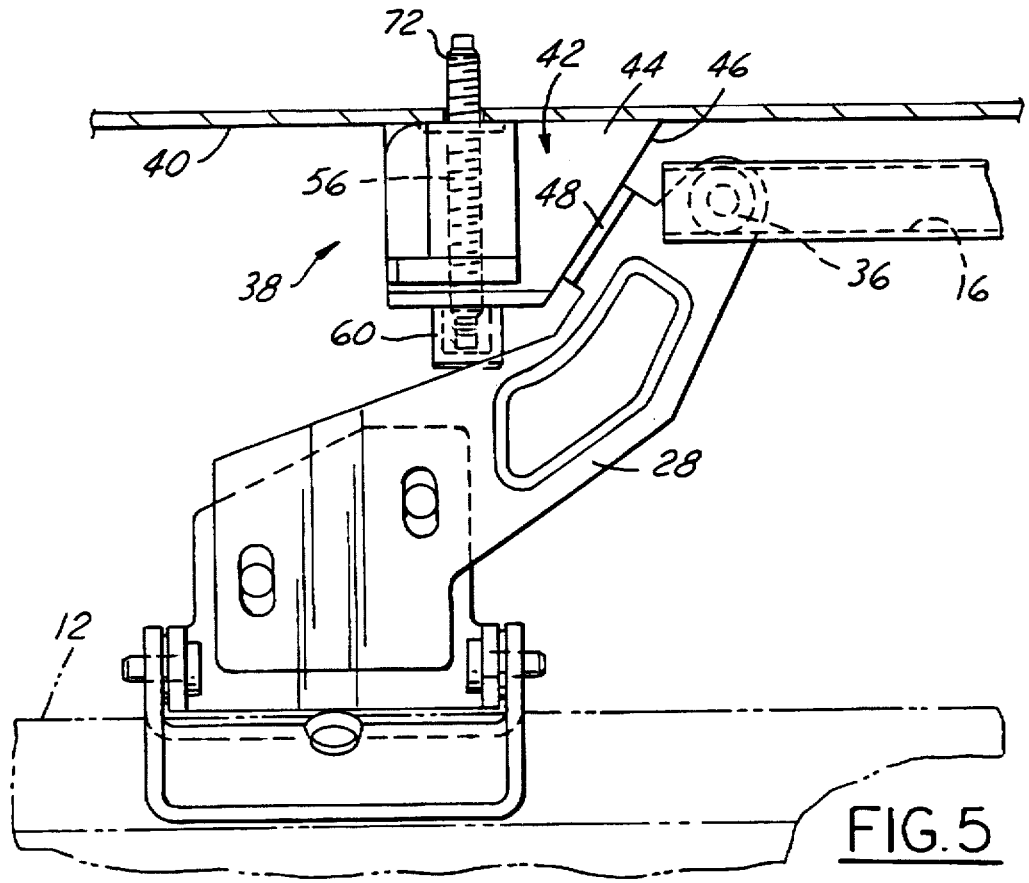
FIG. 5 is a cross-sectional view of a door bumper assembly according to the present invention taken along line 5—5 of FIG. 3.

Turning now to the drawings, and in particular to FIGS. 1–3 thereof, an automotive vehicle 10 is shown having a sliding door 12 on a side thereof, which is typical in van-type vehicles. As is known in the art, the sliding door covers an access opening 14 (FIG. 2) which provides access to and from the vehicle 10 interior. The sliding door 12 has a closed position covering the access opening 14 (FIG. 1) and an open position uncovering the access opening 14 (FIG. 3). The sliding door 12 moves between the open position and the closed position by sliding in a set of door tracks, including an upper track 16 on an upper peripheral edge 18 of the body opening 14, a lower track 20 on a lower peripheral edge 22 of the body opening 14, and a center track 24 on a rear quarter panel 26 of the vehicle 10 (FIG. 2). The sliding door 12 has front hinges 28 generally mounted along a forward edge 30 and a rear hinge 32 mounted on a rear edge 34. The hinges 28, 32 have rollers 36 on non-attached ends for sliding cooperation with the tracks 16, 20, 24, as is known in the art (FIG. 2). As seen in FIGS. 2, 4 and 5, a dual function, adjustable door bumper assembly 38 is mounted at a rearward end of the upper track 16 on a vehicle body surface 40.

Referring now to FIGS. 5–8, the dual function, adjustable door bumper assembly 38, according to the preferred embodiment of the present invention, will be a described in more detail. The bumper assembly 38 has a bumper base 42 of molded rubber material mounted to the vehicle surface 40 at a rearward end of the upper track 16. The bumper base 42 has a first portion 44 with a hinge face 46 for contacting a stop surface 48 of the hinge 28 (FIGS. 5 and 7) when the sliding door 12 is moved to the open position. The bumper base 42 has a second portion 50 on an upper surface 52 of the first portion 44 (FIGS. 6 and 7). The second portion 50 has a bore 54 therethrough for receiving an attachment bolt 56 (FIGS. 5–8). A first end 58 of the attachment bolt 56 is attached to a generally cylindrically shaped bumper 60 of molded rubber material having a base face 62 with a depression 64 for receiving a threaded member 66 therein (FIGS. 6 and 8) such as a threaded nut, as is known by those skilled in the art. The bumper member 60 has a substantially flat door face 68 contactable with a door inner surface 70 when the sliding door is in the closed position (FIGS. 6 and 8). The bumper member 60 is thus laterally adjustable with respect to the vehicle 10 so that the door face 68 contacts the inner surface 70 of the door 12 to provide a predetermined lateral load thereto. Adjustment of the bumper member 60 relative to the bumper base 42 is accomplished by turning the bumper member 60 on the first end 58 of the attachment bolt 56. Such a feature provides the advantage of allowing a lateral load on a rear portion of the door to be adjustable so that with time, and vehicle usage, changes of the vehicle door 12 with respect to the vehicle 10 may be accommodated.

The bumper base 42 is attached to the vehicle 10 with a second end 72 of the attachment bolt 56 in known fashion (FIGS. 5 and 6).

For purposes of this disclosure, the term "fully open position" when referring to the sliding door 12, means that position when the door hinge 28 contacts the bumper assembly 38, as seen in FIG. 5.

In a second embodiment of the present invention, as seen in FIG. 9, the bumper member 160 has a conical portion 168 to provide point contact with the door inner surface 70. Such an arrangement allows the advantageous lateral load to be applied to a vehicle door which does not have a flat door inner surface in the vicinity of the bumper assembly 38.

In a second embodiment, as seen in FIG. 10, the bumper member 60 is biased in a lateral direction by a torsional spring 80 mounted between the bumper member 60 and the bumper base 42. The torsional spring 80 has the attachment bolt 56 passing axially therethrough. The spring constant of the spring 80 can be adjusted to provide a desired lateral load upon the door 12, and such an arrangement allows the lateral load to be dynamically varied with road conditions.

Although the preferred embodiment of the present invention has been disclosed, various changes and modifications may be made without departing from the scope of the invention as set forth in the appended claims.

We claim:

1. In an automotive vehicle having a body opening closable by a sliding door movable between a closed position and an open position within a door track along a door peripheral edge by a roller connected to the door by a hinge, a dual function, adjustable door bumper assembly comprising:

a bumper head having a door face contactable with an inner surface of the door when the door is in the closed position;

a bumper base mounted between the bumper head and a vehicle body surface at a rearward end of the door track, and having a hinge face for contacting the hinge to prevent door movement when the door is moved to the open position;

means for attaching the bumper head to the bumper base; and means for laterally adjusting the bumper head with respect to the bumper base so that the door face contacts the inner surface of the door to provide a predetermined lateral load thereto.

2. A door bumper assembly according to claim 1 and further including bias means for biasing the bumper head against the door inner surface.

3. A door bumper assembly according to claim 1 wherein the door face has a conical portion to provide point contact with the door inner surface.

4. In an automotive vehicle having a body opening closable by a sliding door movable between a closed position and an open position within a door track along a door peripheral edge by a roller connected to the door by a hinge, a dual function, adjustable door bumper assembly comprising:

a bumper head having a door face contactable with a door inner surface when the door is in the closed position and a base face with an attachment receiving member therein;

a bumper base mounted between the bumper head and a vehicle body surface at a rearward end of the door track, and having a hinge face for contacting the hinge to prevent door movement when the door is moved to the open position;

an attachment member having a first end attached to the attachment receiving member of the bumper head, a shaft passing through the bumper base, and a second end attached to a vehicle body portion; and the attachment receiving member cooperating with the attachment member to provide lateral adjustment of the bumper head with respect to the vehicle so that the door face contacts the inner surface of the door to provide a predetermined lateral load thereto.

5. A door bumper assembly according to claim 4 wherein the attachment receiving member is a threaded nut.

6. A door bumper assembly according to claim 5 wherein the attachment member is a bolt having threads on the first and second ends, the bumper head rotatable about the bolt to provide lateral adjustment.

7. A door bumper assembly according to claim 4 wherein the door face has a conical portion to provide point contact with the door inner surface.

8. A door bumper assembly according to claim 4 wherein the bumper head and the bumper base are made of a molded rubber material.

9. A dual function, adjustable door bumper assembly for an automotive vehicle having a body opening closable by a sliding door movable between a closed position and a fully open position within a door track along a door peripheral edge by a roller connected to the door by a hinge, the assembly mounted near the door track and comprising:

a generally cylindrically shaped bumper member having a substantially flat face contactable with a door inner surface when the sliding door is in the closed position, and a base face having a depression with a threaded member therein;

a bumper base mounted between the bumper head and a vehicle body surface at a rearward end of the door track, the bumper base having:

a first portion with a hinge face for contacting the hinge to prevent door movement when the door is moved to the open position; and a second portion having a channel therethrough;

an attachment bolt passing through the channel with a first end attached to the threaded member in the base face of the bumper head, and a second end mounted to a vehicle body portion; and the bumper member laterally adjustable with respect to the vehicle so that the door face contacts the inner surface of the door to provide a predetermined lateral load thereto.

10. An assembly according to claim 9 wherein the second end is movably mounted to the vehicle body portion, and the assembly has bias means for biasing the bumper member against the inner door surface.

11. An assembly according to claim 10 wherein the bias means comprises a torsional spring mounted between the bumper member and the bumper base with the attachment bolt passing therethrough.

12. An assembly according to claim 9 wherein the second portion of the bumper base is situated on top of the first portion of the bumper base.

* * * * *